United States Patent
Takehara et al.

(10) Patent No.: US 7,556,119 B2
(45) Date of Patent: Jul. 7, 2009

(54) VEHICLE COLLISION SENSING SYSTEM

(75) Inventors: Satoru Takehara, Kariya (JP); Toshihito Nonaka, Chiryu (JP)

(73) Assignee: DENSO CORPORATION, Kariya (JP)

( * ) Notice: Subject to any disclaimer, the term of this patent is extended or adjusted under 35 U.S.C. 154(b) by 281 days.

(21) Appl. No.: 11/729,541

(22) Filed: Mar. 29, 2007

(65) Prior Publication Data

US 2007/0227798 A1 Oct. 4, 2007

(30) Foreign Application Priority Data

Mar. 31, 2006 (JP) ............................. 2006-100267

(51) Int. Cl.
*B60T 7/22* (2006.01)

(52) U.S. Cl. ..................... 180/274; 180/282; 701/45

(58) Field of Classification Search ................ 280/735; 180/274, 282; 701/45
See application file for complete search history.

(56) References Cited

U.S. PATENT DOCUMENTS

| 5,338,062 | A | * | 8/1994 | Kiuchi et al. ............... 280/735 |
| 5,748,075 | A | | 5/1998 | Dirmeyer et al. |
| 5,974,892 | A | | 11/1999 | Swart et al. |
| 6,095,553 | A | * | 8/2000 | Chou et al. ................. 280/735 |
| 6,553,295 | B1 | * | 4/2003 | Bauch et al. ................. 701/45 |
| 7,422,086 | B2 | * | 9/2008 | Bujak ........................ 180/274 |
| 7,484,756 | B2 | * | 2/2009 | Le et al. .................... 280/735 |
| 7,487,022 | B2 | * | 2/2009 | Glaser ......................... 701/45 |
| 2005/0206142 | A1 | * | 9/2005 | Prakah-Asante et al. .... 280/735 |
| 2006/0244245 | A1 | * | 11/2006 | Nonaka et al. .............. 280/735 |
| 2007/0051599 | A1 | * | 3/2007 | Takehara et al. ...... 200/61.45 R |
| 2007/0114771 | A1 | * | 5/2007 | Wanami et al. ............. 280/735 |

FOREIGN PATENT DOCUMENTS

| DE | 100 62 427 | 7/2002 |
| JP | 02-249740 | 10/1990 |
| JP | 05-221283 | 8/1993 |
| JP | 08-075772 | 3/1996 |

OTHER PUBLICATIONS

Examination Report dated Feb. 11, 2008 in German Application No. 10 2007 014986.9 with English translation thereof.

* cited by examiner

*Primary Examiner*—Toan C To
(74) *Attorney, Agent, or Firm*—Harness, Dickey & Pierce, PLC

(57) ABSTRACT

Right and left side pressure sensors are provided to left and right doors, respectively, of a vehicle to sense a pressure in a door interior space of the corresponding door. An ECU computes a corrective pressure change amount that is obtained by correcting a change amount of a pressure, which is measured with a collided side one of the pressure sensors arranged in a collided one of the left and right doors that is collided with an object, based on a pressure, which is measured with a non-collided side one of the pressure sensors arranged in a non-collided one of the left and right doors that is not collided with the object. The ECU determines occurrence of the collision of the object based on the corrective pressure change amount.

3 Claims, 6 Drawing Sheets

VEHICLE COLLISION SENSING SYSTEM

CROSS REFERENCE TO RELATED APPLICATION

This application is based on and incorporates herein by reference Japanese Patent Application No. 2006-100267 filed on Mar. 31, 2006.

BACKGROUND OF THE INVENTION

1. Field of the Invention

The present invention relates to a vehicle collision sensing system, which senses a collision to a lateral surface of a vehicle.

2. Description of Related Art

For example, Japanese Unexamined Patent Publication No. H02-249740 recites a pressure sensor, which is arranged in an interior of a vehicle door and serves as a side collision sensing means for sensing a collision to a lateral surface of a vehicle (a side collision of the vehicle) and for activating an occupant protective device (e.g., a side air bag) upon occurrence of the side collision. According to Japanese Unexamined Patent Publication No. H02-249740, an air tightly sealed air tank is placed in the interior of the vehicle door, and a pressure inside the air tank is sensed with the pressure sensor. When the pressure of the air tank, which is sensed with the pressure sensor, becomes equal to or greater than a predetermined threshold value, it is determined that an object collides with a side of the vehicle, and thereby the air bag or the like is activated.

In the case of Japanese Unexamined Patent Publication No. H02-249740, an accommodating space for accommodating the air tank is required in the interior of the vehicle door. Thus, there are limitations in terms of the designing of the vehicle door and the air tank. Furthermore, the provision of the air tank causes an increase in the costs. In order to address the above disadvantages, it is conceivable to sense the side collision of the vehicle by directly sensing the pressure in the vehicle door interior space with a pressure sensor. Specifically, the pressure of the vehicle door interior space is compared with a predetermined threshold value to sense occurrence of the collision of the vehicle.

However, the pressure of the vehicle door interior space may significantly change when the atmospheric pressure changes due to a change in an altitude of the current location of vehicle or a change in weather of the current location of the vehicle. Thus, in the case where such a pressure of the vehicle door interior space is compared with the predetermined threshold value to sense the occurrence of the collision of the vehicle, the occurrence of the collision of the vehicle may not be accurately sensed. This is also true in the above case where the air tank is used to sense the occurrence of the collision of the vehicle.

In view of this, it is also conceivable to use a pressure change amount, i.e., an amount of change in the pressure of the vehicle door interior space to sense the occurrence of the collision instead of the pressure in the vehicle door interior space. However, the pressure change amount varies when the atmospheric pressure changes even in the case where the amount of change in the interior space of the vehicle door is the same. That is, the occurrence of the collision may not be accurately sensed even when the pressure change amount is used.

SUMMARY OF THE INVENTION

The present invention addresses the above disadvantage. Thus, it is an objective of the present invention to provide a vehicle collision sensing system, which is capable of effectively sensing a collision to a lateral surface of a vehicle even when an atmospheric pressure changes due to a change in an altitude or a change in weather.

To achieve the objective of the present invention, there is provided a vehicle collision sensing system that is provided in a vehicle to sense a collision of an object to a lateral surface of the vehicle. The vehicle collision sensing system includes a plurality of pressure sensors, a correcting means and a collision determining means. The pressure sensors are provided to left and right doors, respectively, of the vehicle in such a manner that each pressure sensor is received in a door interior space of a corresponding one of the left and right doors to sense a pressure in the door interior space. The correcting means is for computing a corrective pressure change amount that is obtained by correcting a change amount of a pressure, which is measured with a collided side one of the plurality of pressure sensors arranged in a collided one of the left and right doors that is collided with the object, based on a pressure, which is measured with a non-collided side one of the plurality of pressure sensors arranged in a non-collided one of the left and right doors that is not collided with the object. The collision determining means is for determining occurrence of the collision of the object based on the corrective pressure change amount, which is computed with the correcting means.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Now, various embodiments of the present invention will be described with reference to the accompanying drawings.

First Embodiment

A vehicle collision sensing system according to a first embodiment of the present invention will be described with reference to FIGS. 1 to 4.

Figure 1:
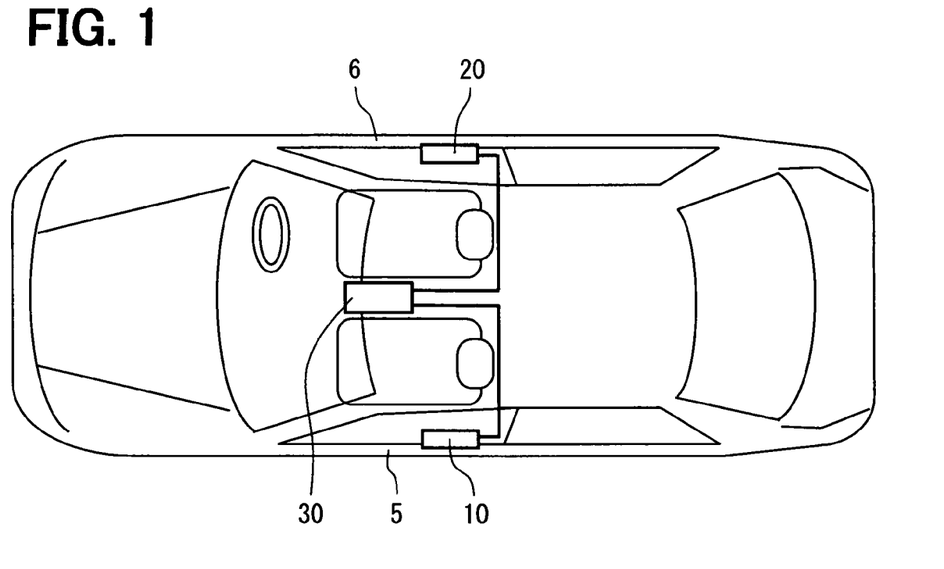
FIG. 1 is a diagram showing a construction of a vehicle collision sensing system according to a first embodiment of the present invention.
Figure 3:
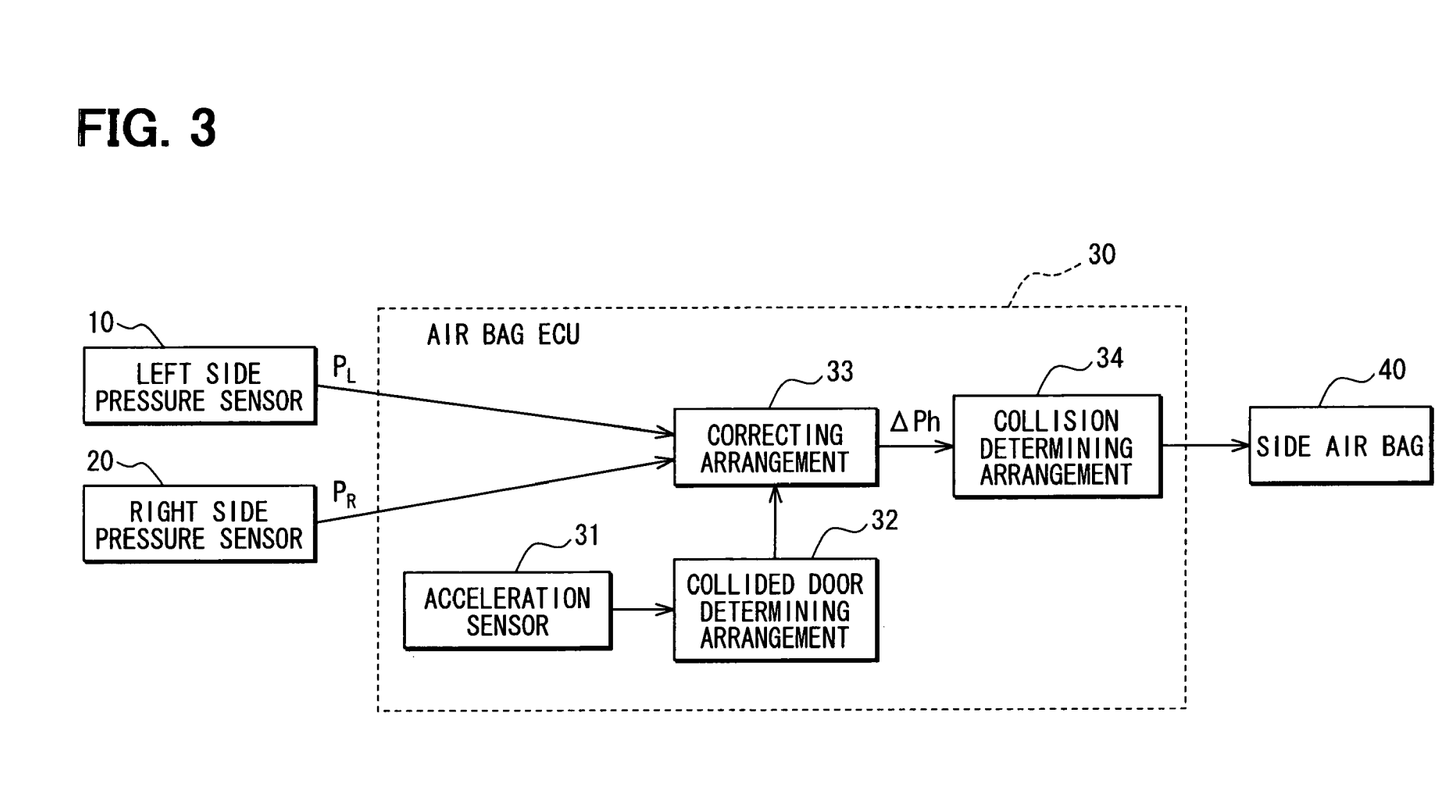
FIG. 3 is a block diagram showing the vehicle collision sensing system of the first embodiment.

The vehicle collision sensing system of the first embodiment is installed in a vehicle and senses occurrence of a collision of an object with a lateral surface of the vehicle. As shown in FIGS. 1 and 3, the vehicle collision sensing system includes a left side pressure sensor 10, a right side pressure sensor 20 and an air bag ECU 30.

The left side pressure sensor 10 is placed in a door interior space 1 of a left side vehicle door 5 to sense a pressure $P_L$ in the door interior space 1 of the left side vehicle door 5. The right side pressure sensor 20 is placed in a door interior space 1 of a right side vehicle door 6 and senses a pressure $P_R$ in the door interior space 1 of the right side vehicle door 6.

The arrangement of the left side pressure sensor 10 in the vehicle will be described with reference to FIGS. 2A and 2B. Although not described in detail, the arrangement of the right side pressure sensor 20 in the vehicle is substantially the same as that of the left side pressure sensor 10 except that the right side pressure sensor 20 is arranged on the right side of the vehicle while the left side pressure sensor 10 is arranged on the left side of the vehicle.

Figure 2A:
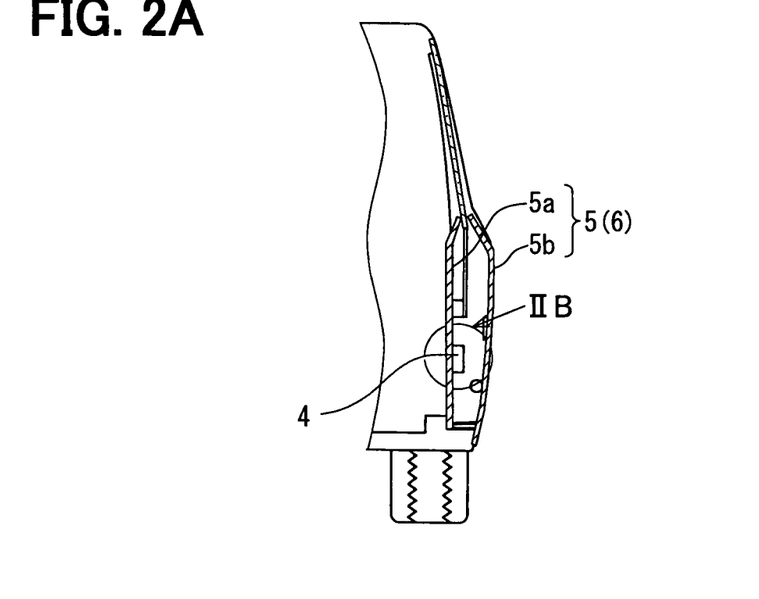
FIG. 2A is a cross sectional view showing an entire structure of a vehicle door, in which the vehicle collision sensing system of the first embodiment is installed.
Figure 2B:
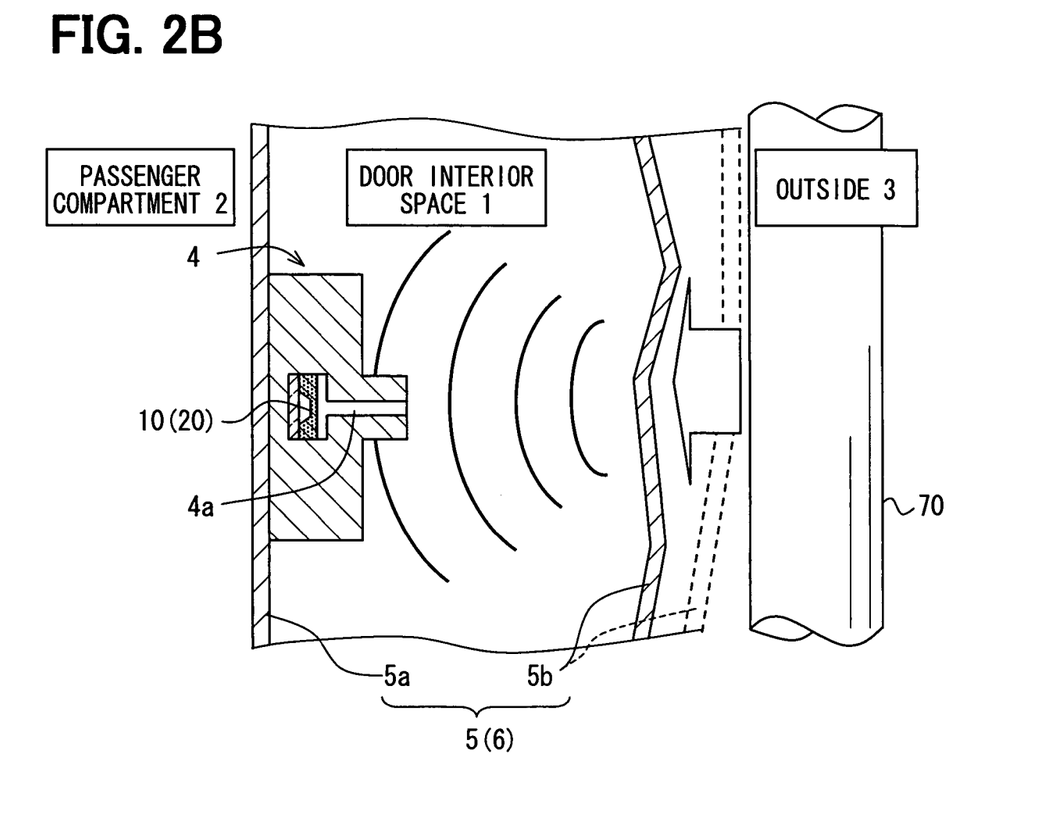
FIG. 2B is an enlarged view of a circled portion indicated by an arrow IIB in FIG. 2A.

As shown in FIGS. 2A and 2B, the left side pressure sensor 10 is received in a sensor module 4. The sensor module 4 is placed in the door interior space 1 of the left side vehicle door 5. Specifically, the sensor module 4 is placed in the door interior space 1, which is formed between an inner panel 5a and an outer panel 5b of the left side vehicle door 5. More specifically, the sensor module 4 is provided to a surface of the inner panel 5a, which is on an outer panel 5b side of the inner panel 5a.

The inner panel 5a is a panel that divides between the door interior space 1 and the vehicle passenger compartment 2, and the outer panel 5b is a panel that divides between the door interior space 1 and the outside 3 of the vehicle. The outer panel 5b is deformed toward the inner panel 5a side when an object (e.g., a utility pole in the present exemplary case) 70 collides with the outer panel 5b, i.e., when the side collision to the outer panel 5b occurs. Specifically, when the object 70 collides with the outer panel 5b, the outer panel 5b is deformed to cause compression and deformation of the door interior space 1.

Furthermore, as shown in FIG. 2B, the sensor module 4 receives the left side pressure sensor 10 and forms a sensing hole 4a. The sensing hole 4a communicates between a door interior space 1 side opening of the sensor module 4 and the left side pressure sensor 10. That is, the left side pressure sensor 10 senses an air pressure $P_L$ in the door interior space 1 through the sensing hole 4a. When the object 70 collides with the outer panel 5b, the left side pressure sensor 10 receives the compressed air of the door interior space 1 through the sensing hole 4a and thereby senses the air pressure $P_L$.

As shown in FIG. 1, the air bag ECU 30 is placed generally at a transverse center (a center in a left-to-right direction of the vehicle) in the vehicle passenger compartment 2. The air bag ECU 30 is directly connected to the left side pressure sensor 10 and the right side pressure sensor 20 through signal cables, respectively. The air bag ECU 30 receives the pressure $P_L$ of the door interior space 1 of the left side vehicle door 5, which is sensed with the left side pressure sensor 10, through the corresponding signal cable. The air bag ECU 30 also receives the pressure $P_R$ of the door interior space 1 of the right side vehicle door 6, which is sensed with the right side pressure sensor 20, through the corresponding signal cable.

Then, the air bag ECU 30 senses the collision of the object 70 to the lateral surface of the vehicle (the left side vehicle door 5 or the right side vehicle door 6) based on the pressures $P_L$, $P_R$, which are received from the left side pressure sensor 10 and the right side pressure sensor 20, respectively. Furthermore, the air bag ECU 30 activates a side air bag 40 when the air bag ECU 30 senses the collision of the object with the lateral surface of the vehicle.

As shown in FIG. 3, the air bag ECU 30 includes an acceleration sensor 31, a collided door determining arrangement (a collided door determining means) 32, a correcting arrangement (a correcting means) 33, and a collision determining arrangement (a collision determining means) 34. The acceleration sensor 31 senses an acceleration in the left-to-right direction of the vehicle. The acceleration, which is sensed with the acceleration sensor 31 at the time of collision of the object 70 to the left side vehicle door 5, differs from the acceleration, which is sensed with the acceleration sensor 31 at the time of collision of the object 70 to the right side vehicle door 6. Specifically, the acceleration, which is sensed with the acceleration sensor 31 at the time of collision of the object 70 to the left side door 5, is large in the direction toward the vehicle right side. In contrast, the acceleration, which is sensed with the acceleration sensor 31 at the time of collision of the object 70 to the right side door 6, is large in the direction toward the vehicle left side.

The collided door determining arrangement 32 (a first collided door determining means of the present invention) determines whether the object 70 collides with the right lateral surface or the left lateral surface of the vehicle based on the acceleration, which is sensed with the acceleration sensor 31. Specifically, the collided door determining arrangement 32 senses the collided one of the left and right side vehicle doors 5, 6, with which the object 70 collides.

Figure 4:
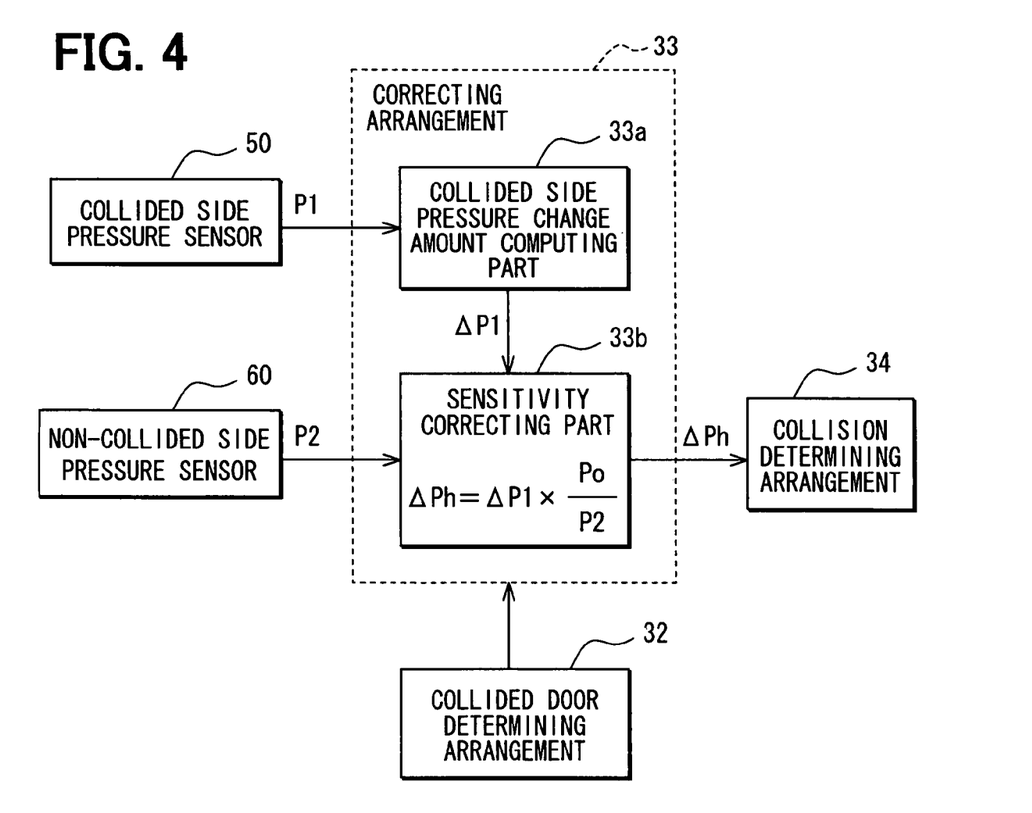
FIG. 4 is a block diagram showing the vehicle collision sensing system of the first embodiment.

The correcting arrangement 33 will be described with reference to FIG. 4. First, the correcting arrangement 33 determines whether the left side pressure sensor 10 is a collided side pressure sensor 50 or a non-collided side pressure sensor 60 and also determines whether the right side pressure sensor 20 is the collided side pressure sensor 50 or the non-collided side pressure sensor 60. For example, when the object 70 collides with the left side vehicle door 5, the correcting arrangement 33 determines that the left side pressure sensor 10 as the collided side pressure sensor 50 and also determines the right side pressure sensor 20 as the non-collided side pressure sensor 60. In contrast, when the object 70 collides with the right side vehicle door 6, the correcting arrangement 33 determines the left side pressure sensor 10 as the non-collided side pressure senor 60 and also determines the right side pressure sensor 2 as the collided side pressure sensor 50.

Then, in the case of the collision of the object 70 with the left side vehicle door 5, the correcting arrangement 33 determines the pressure $P_L$, which is received from the left side pressure sensor 10, as a pressure P1, which is sensed with the collided side pressure sensor 50, and also determines the pressure $P_R$, which is received from the right side pressure sensor 20, as a pressure P2, which is sensed with the non-collided side pressure sensor 60. Here, the pressure P1, which is sensed with the collided side pressure sensor 50, changes with time due to the compression and deformation of the door interior space 1 upon the collision. In contrast, the pressure P2, which is sensed with the non-collided side pressure sensor 60, is kept generally constant. That is, the pressure P2 corresponds to the atmospheric pressure.

Figure 5:
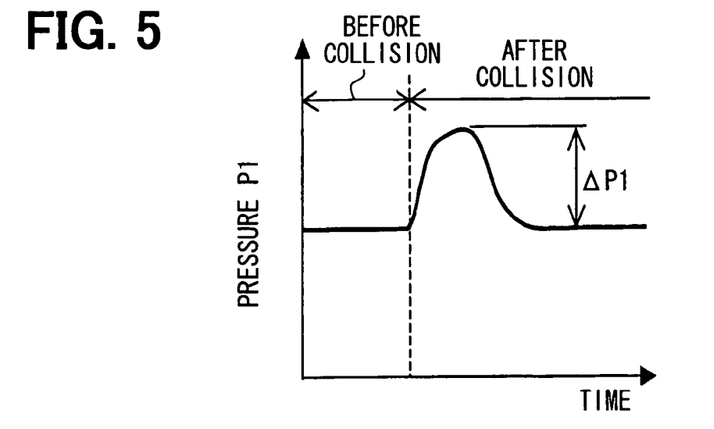
FIG. 5 is a diagram showing behavior of a pressure in a case where an object collides with the vehicle.
Figure 6:
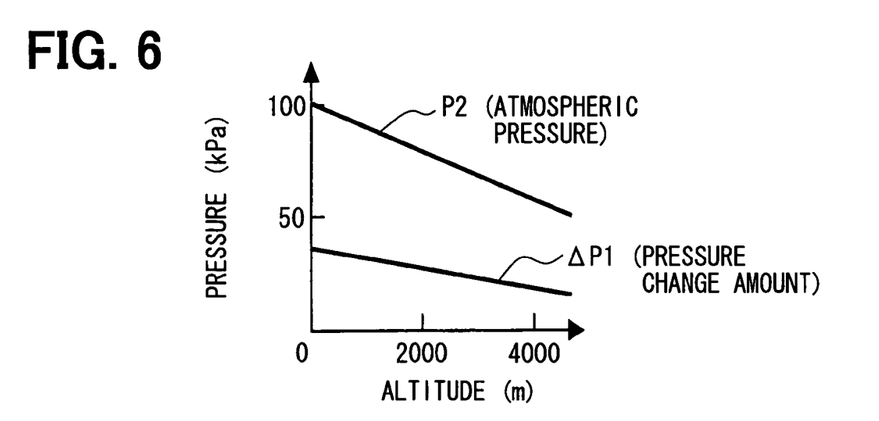
FIG. 6 is a diagram showing a relationship between an altitude and an atmospheric pressure and also showing a relationship between the altitude and a change amount of a pressure.
Figure 7:
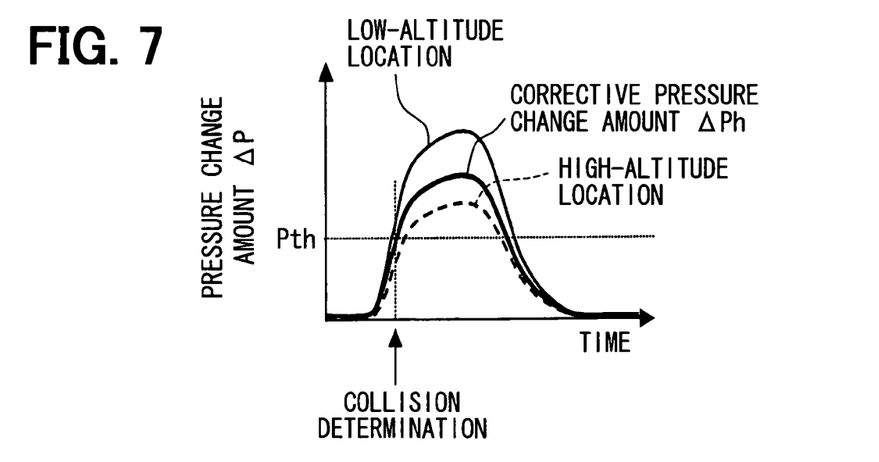
FIG. 7 is a diagram showing a change amount of the pressure in a high-altitude location, a change amount of the pressure in a low-altitude location and a corrective pressure change amount.

The correcting arrangement 33 includes a collided side pressure change amount computing part (a collided side pressure change amount computing means) 33a and a sensitivity correcting part (a sensitivity correcting means) 33b. The collided side pressure change amount computing part 33a computes a change amount ΔP1 of the pressure P1, which is received from the collided side pressure sensor 50. The change amount ΔP1 of the pressure P1 will be described with reference to FIGS. 5 to 7. FIG. 5 shows the behavior of the pressure P1 in the case where the object 70 collides with the vehicle. FIG. 6 shows a relationship between the altitude and the atmospheric pressure P2 and also shows a relationship between the altitude and the change amount ΔP1 of the pressure P1. FIG. 7 shows the change amount ΔP1 of the pressure P1 in the high-altitude location, the change amount ΔP1 of the pressure P1 in the low-altitude location and the corrective pressure change amount ΔPh.

As shown in FIG. 5, the change amount ΔP1 of the pressure P1 is a pressure difference between the pressure P1 before the collision and the pressure P1 right after the collision. The change amount ΔP1 of the pressure p1 is increased when the collision force, which is applied from the object 70 to the vehicle, is increased. Furthermore, the relationship between the altitude and the atmospheric pressure P2 is as follows. That is, as shown in FIG. 6, when the altitude is increased, the atmospheric pressure P2 is decreased. Furthermore, the relationship between the altitude and the change amount ΔP1 of the pressure P1 is as follows. That is, as shown in FIG. 6, when the altitude is increased, the change amount ΔP1 of the pressure P1 is decreased. Thus, as shown in FIG. 7, even when the collision force, which is applied from the object 70 to the vehicle door 5, 6 upon the collision is the same, the change amount ΔP1 of the pressure P1 differs between the high-altitude location and the low-altitude location. That is, in the case of the low-altitude location, the change amount ΔP1 of the pressure P1 is increased in comparison to that of the high-altitude location. As described above, the change amount ΔP1 of the pressure P1, which is computed by the collided side pressure change amount computing part 33a, varies depending on the atmospheric pressure P2 at the corresponding altitude where the vehicle is located.

The sensitivity correcting part 33b performs a correction process for correcting the change amount ΔP1 of the pressure P1, which is computed by the collided side pressure change amount computing part 33a, based on the pressure P2, which is received from the non-collided side pressure sensor 60. This correction process is a process for computing a corrective pressure change amount ΔPh according to the following equation (1) where P0 is the standard pressure, i.e., standard atmosphere (101.3 kPa).

$$\Delta Ph = \Delta P1 \times \frac{P0}{P2} \qquad \text{Equation (1)}$$

Thus, as shown in FIG. 7, in the case where the collision force, which is applied from the object 70 to the vehicle door 5, 6 is the same, the corrective pressure change amount ΔPh is independent from the atmospheric pressure P2 and shows the constant behavior. That is, the corrective pressure change amount ΔPh does not change as long as the collision force, which is applied from the object 70 to the vehicle door 5, 6, is the same in the case of the low-altitude location and also in the case of the high-altitude location.

The collision determining arrangement 34 determines whether the object 70 collides with the vehicle door 5, 6, in which the collided side pressure sensor 50 is provided, based on the corrective pressure change amount ΔPh, which is computed by the sensitivity correcting part 33b of the correcting arrangement 33. For example, the collision determining arrangement 34 determines this based on whether the corrective pressure change amount ΔPh exceeds a threshold value Pth. In the case where the corrective pressure change amount ΔPh exceeds the threshold value Pth, the collision determining arrangement 34 determines that the object 70 collides with the vehicle door 5, 6, in which the collided side pressure sensor 50 is provided.

Furthermore, when the collision determining arrangement 34 determines that the object 70 collides with the vehicle door 5, 6, in which the collided side pressure sensor 50 is provided, the collision determining arrangement 34 activates the side air bag 40. Specifically, when the collision determining arrangement 34 determines that the object 70 collides with the left side vehicle door 5, the collision determining arrangement 34 activates the side air bag 40 on the vehicle left side. Alternatively, when the collision determining arrangement 34 determines that the object 70 collides with the right side vehicle door 6, the collision determining arrangement 34 activates the side air bag 40 on the vehicle right side.

In the above embodiment, the collision determination is made through use of the corrective pressure change amount ΔPh, which does not depend on the atmospheric pressure. Thus, even when the atmospheric pressure changes due to the change in the altitude or the weather, it is possible to reliably sense the side collision of the vehicle. Thereby, it is possible to reliably activate the side air bag 40.

Second Embodiment

Figure 8:
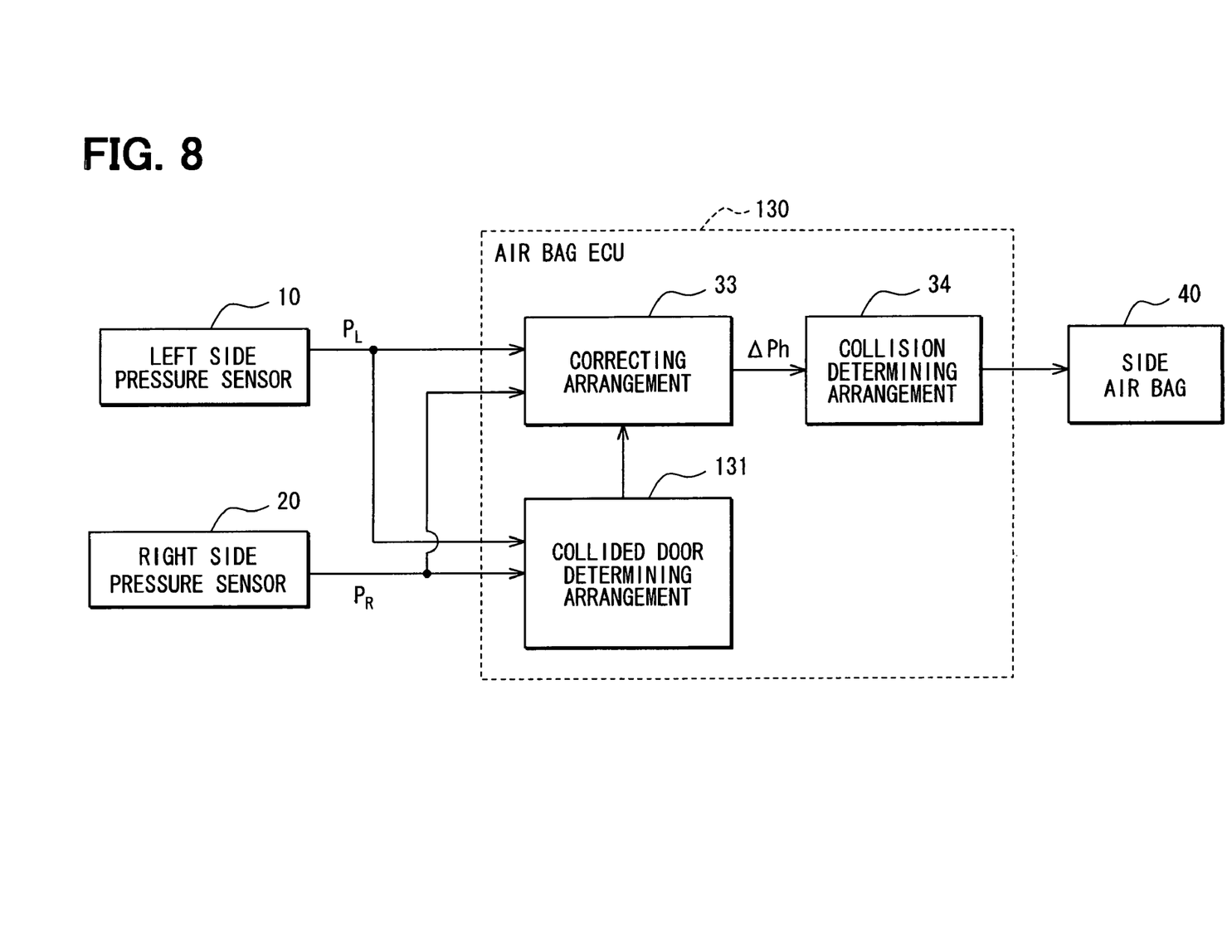
FIG. 8 is a block diagram showing a vehicle collision sensing system according to a second embodiment of the present invention.
Figure 9:
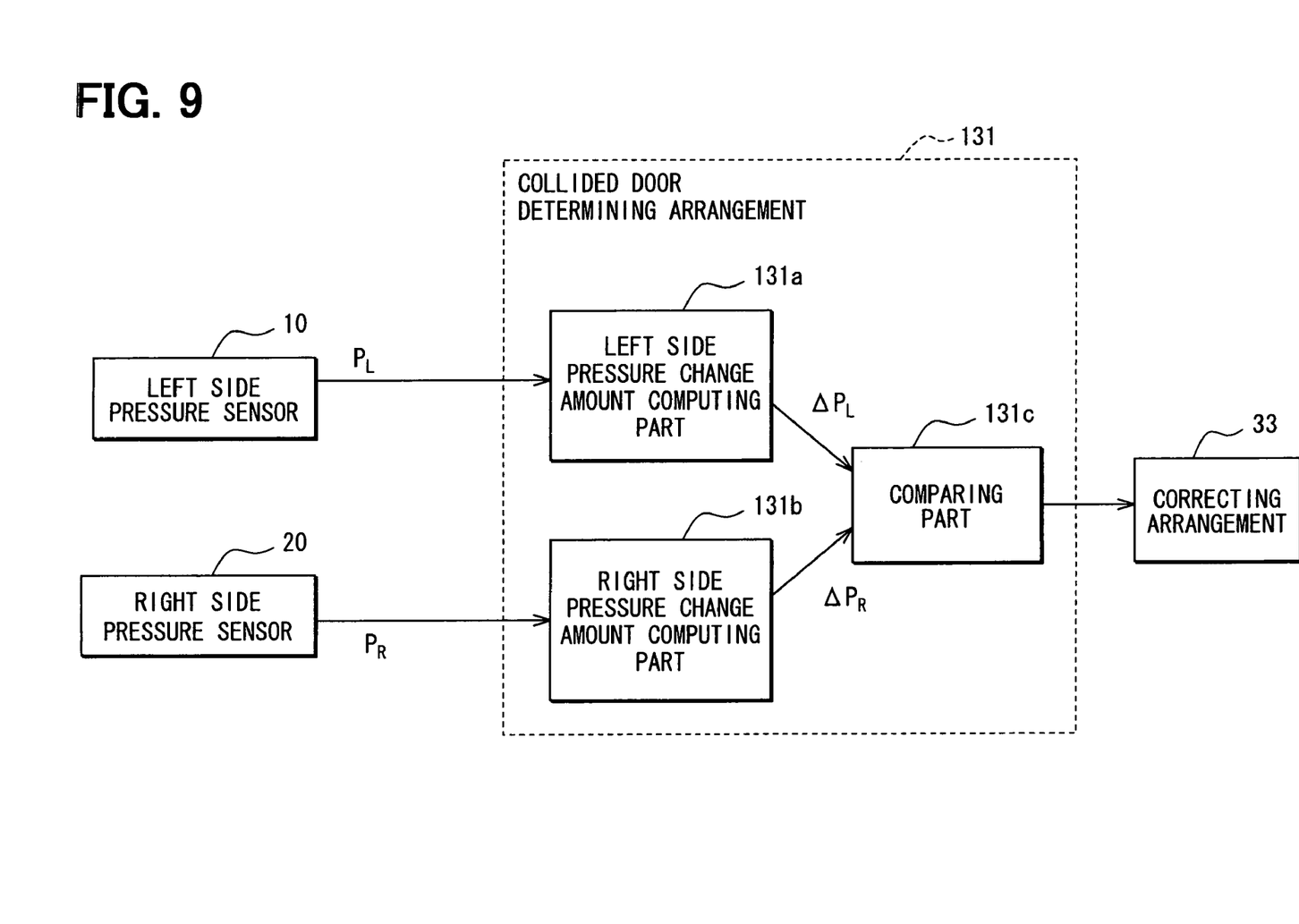
FIG. 9 is a block diagram showing the vehicle collision sensing system according to the second embodiment.

A vehicle collision sensing system according to a second embodiment of the present invention will be described with reference to FIGS. 8 and 9. FIGS. 8 and 9 are block diagrams showing a vehicle collision sensing system according to the second embodiment. In the following description, the components of the vehicle collision sensing system, which are similar to those of the first embodiment, will be indicated by the same numerals and will not be described further. Thus, in the following description, only the differences between the vehicle collision sensing system of the second embodiment and the vehicle collision sensing system of the first embodiment will be described.

As shown in FIG. 8, the vehicle collision sensing system of the second embodiment includes the left side pressure sensor 10, the right side pressure sensor 20 and an air bag ECU 130.

The air bag ECU 130 receives the pressure $P_L$ of the door interior space 1 of the left side vehicle door 5, which is sensed with the left side pressure sensor 10. The air bag ECU 30 also receives the pressure $P_R$ of the door interior space 1 of the right side vehicle door 6, which is sensed with the right side pressure sensor 20. Then, the air bag ECU 130 senses the collision of the object 70 to the lateral surface of the vehicle (the left side vehicle door 5 or the right side vehicle door 6) based on the pressures $P_L$, $P_R$, which are received from the left side pressure sensor 10 and the right side pressure sensor 20. Furthermore, the air bag ECU 130 activates a side air bag 40 when the air bag ECU 130 senses the collision of the object 70 with the lateral surface of the vehicle.

The air bag ECU 130 includes a collided door determining arrangement (a collided door determining means) 131, the correcting arrangement 33 and the collision determining arrangement 34. As shown in FIG. 9, the collided door determining arrangement 131 (a second collided door determining means of the present invention) includes a left side pressure change amount computing part (a left side pressure change amount computing means) 131a, a right side pressure change amount computing part (a right side pressure change amount computing means) 131b and a comparing part (a comparing means) 131c.

The left side pressure change amount computing part 131a receives the pressure $P_L$, which is sensed with the left side pressure sensor 10, and computes a change amount $\Delta P_L$ of the pressure $P_L$. Here, the change amount $\Delta P_L$ of the pressure $P_L$ is similar to the change amount $\Delta P1$ of the pressure P1 described above. That is, the change amount $\Delta P_L$ of the pressure $P_L$ is a pressure difference between the pressure $P_L$ before the collision and the pressure $P_L$ after the collision. Thus, when the object 70 collides with the left side vehicle door 5, the change amount $\Delta P_L$ of the pressure $P_L$ becomes a relatively large value. In contrast, when the object 70 does not collide with the left side vehicle door 5, the change amount $\Delta P_L$ of the pressure $P_L$ becomes substantially zero.

The right side pressure change amount computing part 131b receives the pressure $P_R$, which is sensed with the right side pressure sensor 20. Then, the right side pressure change amount computing part 131b computes a change amount $\Delta P_R$ of the pressure $P_R$. Here, the change amount $\Delta P_R$ of the pressure $P_R$ is a pressure difference between the pressure $P_R$ before the collision and the pressure $P_R$ after the collision. Thus, when the object 70 collides with the right side vehicle door 6, the change amount $\Delta P_R$ of the pressure $P_R$ becomes a relatively large value. In contrast, when the object 70 does not collide with the right side vehicle door 6, the change amount $\Delta P_R$ of the pressure $P_R$ becomes substantially zero.

The comparing part 131c compares the pressure change amount $\Delta P_L$, which is computed by the left side pressure change amount computing part 131a, and the pressure change amount $\Delta P_R$, which is computed by the right side pressure change amount computing part 131b. Here, in the case where the object 70 collides with the left side vehicle door 5 while not colliding with the right side vehicle door 6, the left side pressure change amount $\Delta P_L$ becomes larger than the right side pressure change amount $\Delta P_R$. In such a case, the comparing part 131c determines that the object 70 collides with the left side vehicle door 5. In contrast, in the case where the object 70 collides with the right side vehicle door 6 while not colliding with the left side vehicle door 5, the right side pressure change amount $\Delta P_R$ becomes larger than the left side pressure change amount $\Delta P_L$. In such a case, the comparing part 131c determines that the object 70 collides with the right side vehicle door 6.

Then, the correcting arrangement 33 determines whether the left side pressure sensor 10 is the collided side pressure sensor 50 or the non-collided side pressure sensor 60 and also determines whether the right side pressure sensor 20 is the collided side pressure sensor 50 or the non-collided side pressure sensor 60. Then, the correcting arrangement 33 computes the corrective pressure change amount $\Delta Ph$.

When the collision determining mean 34 determines that the object 70 collides with the vehicle door 5, 6 upon executing the collision determination operation based on the corrective pressure change amount $\Delta Ph$, the collision determining arrangement 34 activates the side air bag 40.

In the above embodiment, the collision determination is made through use of the corrective pressure change amount $\Delta Ph$, which does not depend on the atmospheric pressure. Thus, even when the atmospheric pressure changes due to the change in the altitude or the weather, it is possible to reliably sense the side collision of the vehicle. Thereby, it is possible to reliably activate the side air bag 40.

Additional advantages and modifications will readily occur to those skilled in the art. The invention in its broader terms is therefore not limited to the specific details, representative apparatus, and illustrative examples shown and described.

What is claimed is:

1. A vehicle collision sensing system that is provided in a vehicle to sense a collision of an object to a lateral surface of the vehicle, the vehicle collision sensing system comprising:
   a plurality of pressure sensors that are provided to left and right doors, respectively, of the vehicle in such a manner that each pressure sensor is received in a door interior space of a corresponding one of the left and right doors to sense a pressure in the door interior space;
   a correcting means for computing a corrective pressure change amount that is obtained by correcting a change amount of a pressure, which is measured with a collided side one of the plurality of pressure sensors arranged in a collided one of the left and right doors that is collided with the object, based on a pressure, which is measured with a non-collided side one of the plurality of pressure sensors arranged in a non-collided one of the left and right doors that is not collided with the object; and
   a collision determining means for determining occurrence of the collision of the object based on the corrective pressure change amount, which is computed with the correcting means.

2. The vehicle collision sensing system according to claim 1, further comprising:
   an acceleration sensor that is provided in the vehicle to sense an acceleration of the vehicle; and
   a collided door determining means for determined the collided one of the left and right doors based on the sensed acceleration, which is sensed with the acceleration sensor, wherein the correcting means computes the corrective pressure change amount based on a result of the determination made by the collided door determining means.

3. The vehicle collision sensing system according to claim 1, further comprising a collided door determining means for determining the collided one of the left and right doors based on a change amount of the sensed pressure of each of the plurality of pressure sensors, wherein the correcting means computes the corrective pressure change amount based on a result of the determination made of the collided door determining means.

* * * * *